No. 708,273. Patented Sept. 2, 1902.
J. TUTTERROW.
SAW.
(Application filed Apr. 23, 1902.)
(No Model.)
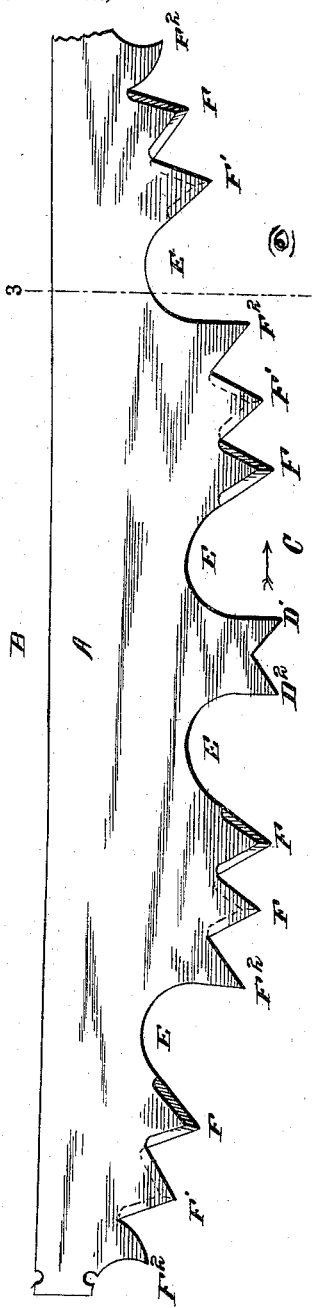
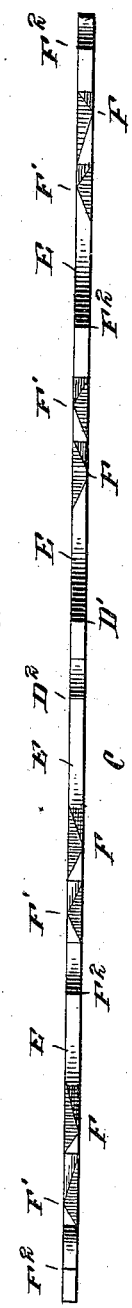
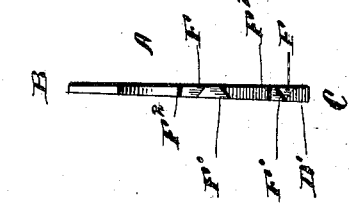
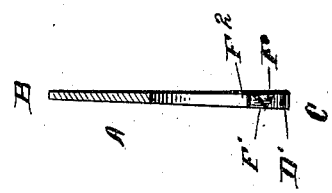
Witnesses
Chas. K. Davies.
M. E. Brown
Inventor
J. Tutterrow
By W. A. Bartlett
Attorney

UNITED STATES PATENT OFFICE.

JOSEPH TUTTERROW, OF MORGANTOWN, INDIANA.

SAW.

SPECIFICATION forming part of Letters Patent No. 708,273, dated September 2, 1902.

Application filed April 23, 1902. Serial No. 104,258. (No model.)

*To all whom it may concern:*

Be it known that I, JOSEPH TUTTERROW, residing at Morgantown, in the county of Morgan and State of Indiana, have invented certain new and useful Improvements in Saws, of which the following is a specification, reference being had therein to the accompanying drawings.

This invention relates to crosscut-saws for sawing wood.

The object of the invention is to combine in one saw-blade as many advantageous features as feasible, so as to produce a saw which will both cut and clear itself without "set;" and the invention consists in the construction of a saw, substantially as hereinafter described and claimed.

Figure 1 is a side elevation of a saw-blade embodying the invention. Fig. 2 is an edge view showing by the shading the bevel of the teeth. Fig. 3 is a section on line 3 3, Fig. 1. Fig. 4 is an end view. Fig. 5 is a broken perspective diagram indicating in dotted lines the reverse bevel of certain teeth.

The drawings are not intended to indicate sizes and proportions, but to enable a mechanic skilled in this art to make and use the saw.

The saw-blade A may be of any suitable length, width, and thickness and is of suitable material, preferably tempered steel. The back B of the blade is considerably thinner than the front or toothed edge C. This is so that the blade may not bind in its kerf. As the teeth are thicker than the back of the blade, the teeth cut a kerf which readily admits that part of the blade between the teeth and the back of the blade, and thus without the necessity of any set to the teeth and however much the teeth may be filed or sharpened away unless a very little set be required when the saw is worn thin. The central teeth D form a pair of planers $D'$ $D^2$, with their perpendicular or planer faces set in opposite directions. The planer-tooth $D'$ operates as a planer only when the saw is drawn in the direction of the arrow. When drawn in reverse direction, the tooth rides on the wood at the bottom of the cut made by tooth $D^2$, and vice versa.

From the middle of the saw toward each end the ends of the teeth are arranged in a curve or curves, substantially as indicated, the amount of curvature being at the discretion of the manufacturer.

The teeth other than teeth $D'$ $D^2$ are arranged in groups of three. Each group of three teeth is separated from the adjacent groups by a curved recess E. The width of this recess approximates the width of a group of three teeth, and the depth of the recess (into the saw-blade) is such that it need not be increased until the teeth are worn and cut away as far as the strength of the plate will permit with fair usage. Each group of three teeth is composed of two cutting-teeth and a planer-tooth. The cutting-teeth F F' of each group are beveled on opposite faces, one having its cutting edge or scratch-point in the plane of the extension of one face of the saw-blade and the other in reverse direction, as indicated in Figs. 1 and 2, and in dotted lines, Fig. 3, the bevel being, however, more pronounced than can well be shown by a drawing like Fig. 5. The teeth $F^2$ are planer-teeth. Each planer-tooth $F^2$ faces toward that end of the saw toward which the blade is drawn in cutting—that is, all the planer-teeth at one side of the central planers face in the same direction as that one of the planers $D'$ or $D^2$ to which it is nearest, and each one is a practical duplication of such planer-teeth. The front or planer side or edge of each planer $F^2$ is nearly vertical to the plane of the saw kerf—that is, a line parallel with the back of the saw shown—while the rear side or edge is inclined at something like forty-five degrees to the same line. The front and rear faces of each of the teeth F F' is at something like the same angle. Thus when the saw is drawn in the direction of the arrow teeth F and F' will score the wood at a distance apart equal to the thickness of the saw-blade and the planer $F^2$ of the following group will plane off the wood between such scores or scratches, the space E affording plenty of space for the chips or sawdust so removed to curl over and drop out. In moving the other way the other end of the saw becomes operative.

The number of groups of teeth in a saw depends on the length of the saw-blade and the size of the teeth in the groups. The latter will vary with the character of the work for which the tool is designed.

I am aware that teeth have been arranged in saws in groups and that cutting and planing teeth are both well known.

What I claim is—

1. A crosscut-saw blade much thicker near the cutting edge than at the back, and having a central pair of planer-teeth with perpendicular faces set in opposite directions and a notch between said teeth, the edge curving from said central teeth toward each end of the blade, and having teeth arranged in groups of three with recesses between the groups, said recesses each approximating the width of a group of three teeth, and each group having two cutter-teeth and one clearer-tooth.

2. A crosscut-saw blade with plane sides, the curved edge much thicker than the back, having a central pair of clearing-teeth with perpendicular faces in opposite directions, and teeth arranged in groups of three between said clearing-teeth and the ends of the saw, spaces between the groups of teeth, each space approximating the width of a group of three teeth, each group of three consisting of two cutters beveled on opposite sides and a planer-tooth at the side of the group toward the end of the saw, the planer-teeth having their planer-faces substantially perpendicular to the back of the saw.

In testimony whereof I affix my signature in presence of two witnesses.

JOSEPH TUTTERROW.

Witnesses:
WILLIAM W. DAVIS,
JOHN WERSHING.